Sept. 17, 1940.  T. BIERNACKI  2,215,205
FASTENING DEVICE
Filed July 11, 1939
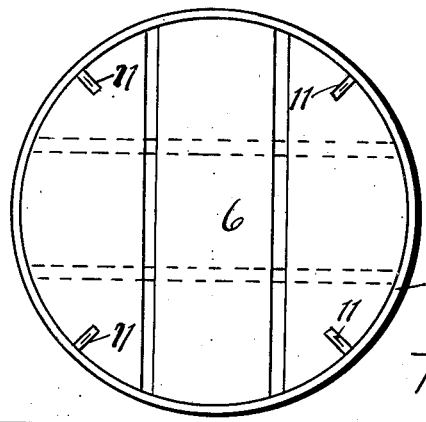
Fig. I.
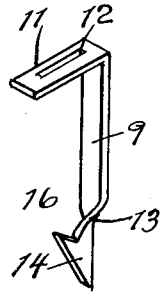
Fig. III.
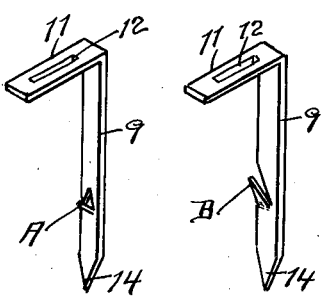
Fig. IV. Fig. V.
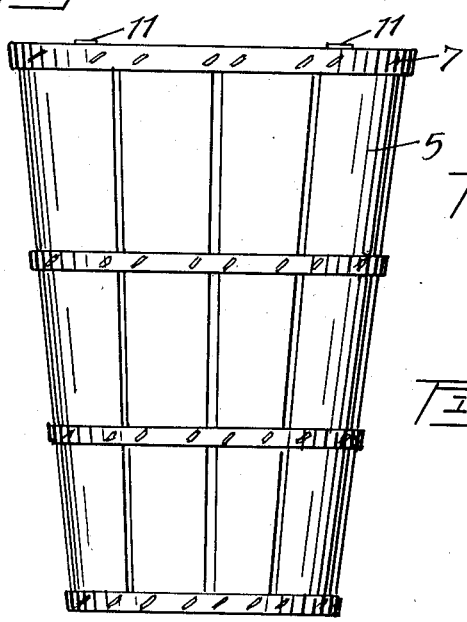
Fig. II.
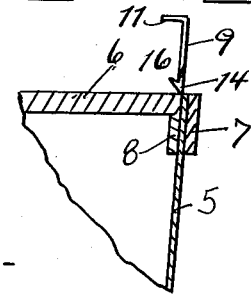
Fig. VI.
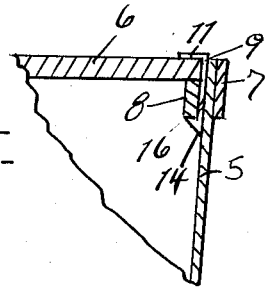
Fig. VII.
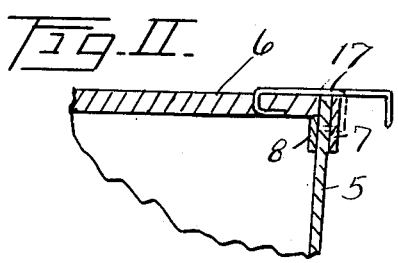
Fig. IX.
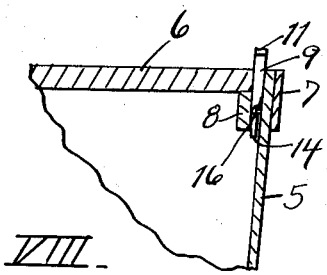
Fig. VIII.
INVENTOR
THEODORE BIERNACKI
BY
ATTORNEY Patented Sept. 17, 1940

2,215,205

UNITED STATES PATENT OFFICE 2,215,205

FASTENING DEVICE

Theodore Biernacki, San Francisco, Calif., assignor to Pacific State Box and Basket Company, Los Angeles, Calif.

Application July 11, 1939, Serial No. 283,779

1 Claim. (Cl. 85—28)

This invention relates to improvements in fastening devices and has particular reference to means for fastening the cover upon vegetable hampers, lug boxes, barrels, and similar receptacles.

The principal object of this invention is to provide a fastening device which is economical to manufacture, one which may be easily used, and one which may be withdrawn for reuse.

A further object of the invention is to produce a device of this character which will not mutilate the receptacle upon which it is used.

A further object of the invention is to provide a fastening element which will have no sharp projections which may be caught in the hands and thus injure the handler of the receptacle.

A further object of the invention is to produce a device which may be removed and replaced at will, thus permitting inspection of the contents of the receptacle.

Other objects and advantages will be apparent during the course of the following description.

In the accompanying drawing forming a part of this specification and in which like numerals are employed to designate like parts throughout the same, Fig. 1 is a top plan view of a vegetable hamper, having my invention applied thereto;

Fig. 2 is a side elevation of Fig. 1;

Fig. 3 is a perspective view of my fastening element;

Figs. 4 and 5 are modified forms of my fastening element;

Fig. 6 is a fragmentary detailed view, partly in cross section, showing the manner in which my fastening element is applied to the hamper;

Fig. 7 is a view similar to Fig. 6, showing my fastening element in locked position;

Fig. 8 is a similar view, showing my fastening device turned and partially withdrawn; and Fig. 9 is a similar view, showing the present type of fastening element in unlocked position and in dotted lines in locked position.

In the picking and handling of vegetables, such as peas, beans, and the like, wooden baskets or hampers are employed and are closed with a wooden cover. Heretofore, it has been common practice to provide the wooden covers with permanently secured fastening elements, the free end of which overlapped the side of the basket and was then bent and driven into the side of the basket. This type of fastening mutilates the basket, often bends, and does not produce a secure locking action. Also, these fastening elements often project from the basket, particularly after the same has been opened for an inspection, and the handlers often injure their hands on these fastening elements.

I have, therefore devised a fastening element which overcomes all the objections above noted and yet permits the top or cover to be removed and replaced at will, a fastening element which may be used over and over again, a fastening element which may be applied and removed without the use of tools, and a fastening element which will hold the top securely in place at all times.

In the accompanying drawing wherein for the purpose of illustration is shown a preferred embodiment of my invention, the numeral 5 designates a conventional hamper, and the numeral 6 designates a removable cover therefor. This hamper has a band or hoop 7 around the top edge thereof and on the outside thereof. A similar hoop 8 is fastened within the top portion of the hamper and at a slight distance below the top, thereof so that the top plane of the cover will lie in the same plane as the top of the hamper.

Referring now to Fig. 3, it will be noted that my fastening element consists of a shank 9 having a head 11 formed at right angles thereto. This head is provided with a slot 12, the purpose of which will be later seen. The lower portion of the shank 9 is twisted, as shown at 13, so as to form a spearhead 14, the major plane of which is at right angles to the major plane of the shank 9. This spearhead is provided with a pointed extremity 16, the purpose of which will be later seen.

In the modified forms shown in Figs. 4 and 5, the construction is identical, with the exception that the pointed extremity is formed by punching out a portion of the shank 9. These punched out portions in the two modified forms are shown at A in Fig. 4 and at B in Fig. 5.

The manner of using my device is as follows:

The spearhead 14 is placed against the cover where it abuts the upper portion of the basket, as indicated in Fig. 6. When in this position, a blow upon the head 11, with a hammer, rock, mallet, or any other similar device, will cause the spearhead to pass downwardly, springing the side of the box sufficiently to permit the pointed extremity 16 to pass downwardly until it engages the inner hoop 8, passing the same and coming to rest, as indicated in Fig. 7. When in this position, the head 11 will engage the cover 6, and the pointed extremity 16 will underlie the bottom of the hoop 8 to prevent a withdrawal of the device. The flat shank 9 will be kept from rotating by being contacted by the side of the hamper and the top and inner hoop.

When it is desired to remove the device, a screwdriver, coin, or similar instrument may be placed in the slot 12 and the fastening element rotated to the position of Fig. 8. Then the device may be pried upwardly and may be entirely removed, if desired.

In the old form shown in Fig. 9, the fastening element 17 is merely a piece of wire permanently secured to the cover 6 and extending beyond the side of the basket. This wire is then struck a blow so as to bend it downwardly, as indicated in dotted lines in this figure. However, the act of bending often does not accomplish the desired purpose, and these wires are subject to catching in any object with which they come in contact.

It is to be understood that the forms of my invention herewith shown are to be taken as preferred examples of the same and that various changes relative to the material, size, shape and arrangement of parts may be resorted to without departing from the spirit of the invention or the scope of the subjoined claim.

Having thus described my invention, I claim:

A fastening device comprising a shank portion, a head portion formed at right angles thereto, a spearhead formed integral with said shank, a pointed extremity positioned above said spearhead and formed integral with said shank, and means for rotating said shank about its longest axis and including a slot formed in the head thereof.

THEODORE BIERNACKI.